United States Patent
Klass et al.

(10) Patent No.: US 7,472,224 B1
(45) Date of Patent: Dec. 30, 2008

(54) RECONFIGURABLE PROCESSING NODE INCLUDING FIRST AND SECOND PROCESSOR CORES

(75) Inventors: Richard E. Klass, San Jose, CA (US); Michael L. Golden, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 467 days.

(21) Appl. No.: 10/956,561

(22) Filed: Oct. 1, 2004

(51) Int. Cl.
*G06F 12/00* (2006.01)
*G06F 13/00* (2006.01)

(52) U.S. Cl. ............ 711/119; 711/100; 711/118; 711/154

(58) Field of Classification Search ............ 711/100, 711/118, 119, 122, 138, 154, 170, 111, 155, 711/156
See application file for complete search history.

(56) References Cited

U.S. PATENT DOCUMENTS

| | | | | |
|---|---|---|---|---|
| 5,632,038 | A * | 5/1997 | Fuller | 713/324 |
| 5,649,156 | A * | 7/1997 | Vishlitzky et al. | 711/136 |
| 5,752,045 | A | 5/1998 | Chen | |
| 5,881,311 | A * | 3/1999 | Woods | 710/4 |
| 5,905,994 | A * | 5/1999 | Hori et al. | 711/113 |
| 6,295,580 | B1 | 9/2001 | Sturges | |
| 6,349,363 | B2 | 2/2002 | Cai | |
| 6,356,991 | B1 * | 3/2002 | Bauman et al. | 711/209 |
| 6,751,706 | B2 | 6/2004 | Chauvel | |
| 6,795,896 | B1 | 9/2004 | Hart et al. | |
| 6,983,388 | B2 * | 1/2006 | Kaxiras et al. | 713/324 |
| 7,006,100 | B2 | 2/2006 | Phong | |
| 7,028,191 | B2 * | 4/2006 | Michener et al. | 713/182 |
| 7,089,391 | B2 * | 8/2006 | Geiger et al. | 711/170 |
| 7,093,081 | B2 * | 8/2006 | DeWitt et al. | 711/144 |
| 2001/0032298 | A1 * | 10/2001 | Emons | 711/138 |
| 2003/0135768 | A1 * | 7/2003 | Knee et al. | 713/300 |
| 2004/0024968 | A1 * | 2/2004 | Lesartre et al. | 711/128 |

FOREIGN PATENT DOCUMENTS

EP   1 182 567   2/2002

OTHER PUBLICATIONS

Notification of Transmittal of the International Search Report and the Written Opinion of the International Searching Authority, or the Declaration, International application No. PCT/US2005/033671, Feb. 13, 2006.
International Search Report, International application Mo. PCT/US2005-033671, Sep. 21, 2005.
Written Opinion of the International Searching Authority, International application No. PCT/US2005/033671, Sep. 21, 2005.
Usnal, O., et al., "Cool-Cache for Hot Multimedia," Department of Electrical and Computer Engineering, University of Massachusetts, 2001, pp. 274-283.
"Power Managed Second-Level Cache Control, XP 000587428," IBM Technical Disclosure Bulletin, vol. 39, No. 04, Apr. 1996, pp. 79-82.

\* cited by examiner

*Primary Examiner*—Tuan V. Thai
(74) *Attorney, Agent, or Firm*—Meyertons Hood Kivlin Kowert & Goetzel, P.C.; Stephen J. Curran

(57) ABSTRACT

In one embodiment, a processing node includes a first processor core and a second processor core. The first processor core includes a first cache memory, such as an L2 cache, for example. The second processor core includes a second cache memory, such as an L2 cache memory. The processing node further includes a configuration unit that is coupled to the first processor core and the second processor core. The configuration unit may selectably disable portions of the first and the second cache memories.

22 Claims, 2 Drawing Sheets

RECONFIGURABLE PROCESSING NODE INCLUDING FIRST AND SECOND PROCESSOR CORES

BACKGROUND OF THE INVENTION

1. Field of the Invention

This invention is related to the field of chip multiprocessors (CMP) and, more particularly, to reconfiguration of resources within a CMP.

2. Description of the Related Art

Chip multiprocessors (CMPs) are becoming increasingly popular. A CMP has two or more processor cores implemented on the same integrated circuit (IC) device. The increase in popularity may be due, at least in part, to the notion that a CMP may be a more efficient use of the millions of transistors that may be included on an integrated circuit than, for example, a more elaborate single processor. For example, by sharing processing loads between processor cores, a CMP may execute some tasks at a lower frequency than that required by some single core processors. Lower frequencies may translate in some cases to savings in power and a reduction in the thermal budget.

Since CMPs include multiple processor cores, they may also include circuitry associated with each core. For example, a CMP may include one or more separate cache memories for each processor core. In addition, a CMP may include interconnection circuitry that connects the processor cores to each other and to the chip input/output pins. Due to the structure and complexity of CMPs, manufacturing CMPs to be fully functional may be a challenge.

SUMMARY

Various embodiments of reconfiguration of a processing node including a first processor core and a second processor core are disclosed. In one embodiment, the first processor core includes a first cache memory, such as an L2 cache, for example. The second processor core also includes a second cache memory, such as an L2 cache memory. The processing node further includes a configuration unit that is coupled to the first processor core and the second processor core. The configuration unit may selectably disable portions of the first and the second cache memories.

In one specific implementation, the configuration unit may include one or more storages for storing values that indicate configuration preferences of the first and second processor cores.

In another specific implementation, the configuration unit may further selectably disable portions of the first and the second cache memories dependent upon the values stored within the storages.

In another specific implementation, the processing node includes a memory test unit that may run diagnostics on the first and the second cache memories and in response to detecting a failure in either of the first and the second cache memories, may provide a first failure notification identifying the failure to the configuration unit.

In still another specific implementation, in response to receiving the failure notification, the configuration unit may further selectably disable portions of the first and the second cache memories identified in the first failure notification.

Figure 1:
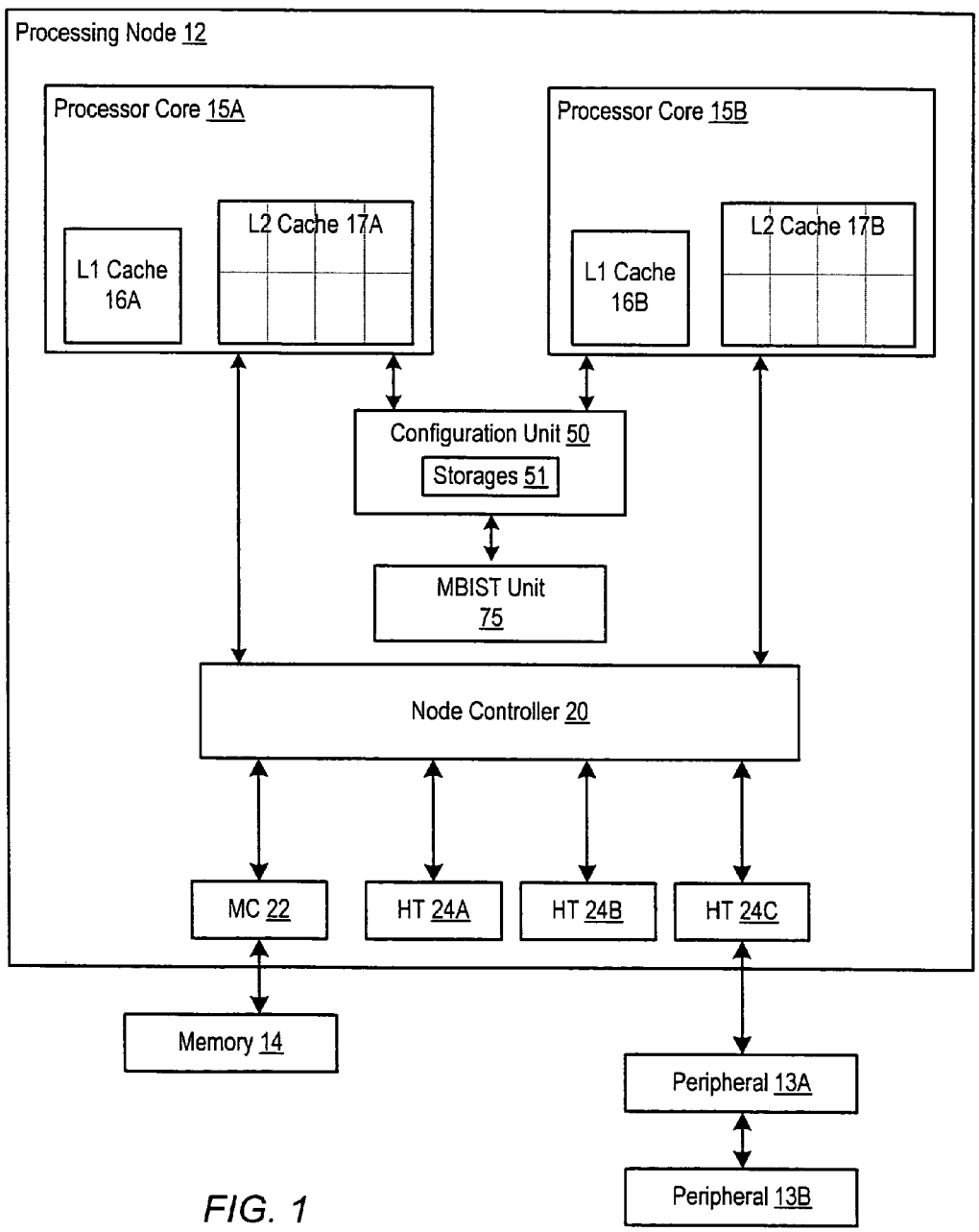
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a block diagram of one embodiment of a computer system 10 is shown. In the illustrated embodiment, the computer system 10 includes a processing node 12 coupled to memory 14 and to peripheral devices 13A-13B. The node 12 includes processor cores 15A-15B coupled to a node controller 20 which is further coupled to a memory controller 22 and a plurality of HyperTransport™ (HT) interface circuits 24A-24C. The processor cores 15A-15B are also coupled to configuration unit 50, which is in turn coupled to a memory built-in self-test unit (MBIST) 75. The HT circuit 24C is coupled to the peripheral device 13A, which is coupled to the peripheral device 13B in a daisy-chain configuration (using HT interfaces, in this embodiment). The remaining HT circuits 24A-B may be connected to other similar processing nodes (not shown) via other HT interfaces (not shown). The memory controller 22 is coupled to the memory 14. In one embodiment, node 12 may be a single integrated circuit chip comprising the circuitry shown therein in FIG. 1. That is, node 12 may be a chip multiprocessor (CMP). Other embodiments may implement the node 12 as two or more separate integrated circuits, as desired. Any level of integration or discrete components may be used.

In one embodiment, node controller 20 may include various interconnection circuits (not shown) for interconnecting processor cores 15A and 15B to each other, to other nodes and to memory. Node controller 20 may also include sets of fuses (not shown) that may be selectively blown during the manufacturing process to represent a plurality of values. In some embodiments, various node properties may be selected by the fuses. The properties include the maximum and minimum operating frequencies for the node and the maximum and minimum power supply voltages for the node. In addition, the fuses may select processor-core specific properties.

The node controller 20 may generally be configured to route communications between the processor cores 15A-15B, the memory controller 22, and the HT circuits 24A-24C dependent upon the communication type, the address in the communication, etc. In one embodiment, the node controller 20 includes a system request queue (SRQ) into which received communications are written by the node controller 20. The node controller 20 may schedule communications from the SRQ for routing to the destination or destinations among the processor cores 15A-15B, the HT circuits 24A-

24C, and the memory controller 22. Operation of the node 12 and its components will be discussed in more detail below.

Generally, the processor cores 15A-15B may use the interface(s) to the node controller 20 to communicate with other components of the computer system 10 (e.g. peripheral devices 13A-13B, other processor cores (not shown), the memory controller 22, etc.). The interface may be designed in any desired fashion. Cache coherent communication may be defined for the interface, in some embodiments. In one embodiment, communication on the interfaces between the node controller 20 and the processor cores 15A-15B may be in the form of packets similar to those used on the HT interfaces. In other embodiments, any desired communication may be used (e.g. transactions on a bus interface, packets of a different form, etc.). In other embodiments, the processor cores 15A-15B may share an interface to the node controller 20 (e.g. a shared bus interface). Generally, the communications from the processor cores 15A-15B may include requests such as read operations (to read a memory location or a register external to the processor core) and write operations (to write a memory location or external register), responses to probes (for cache coherent embodiments), interrupt acknowledgements, and system management messages, etc.

The memory 14 may include any suitable memory devices. For example, a memory 14 may comprise one or more RAMBUS DRAMs (RDRAMs), synchronous DRAMs (SDRAMs), double data rate (DDR) SDRAM, static RAM, etc. The memory controller 22 may comprise control circuitry for interfacing to the memories 14. Additionally, the memory controller 22 may include request queues for queuing memory requests, etc.

The HT circuits 24A-24C may comprise a variety of buffers and control circuitry for receiving packets from an HT link and for transmitting packets upon an HT link. The HT interface comprises unidirectional links for transmitting packets. Each HT circuit 24A-24C may be coupled to two such links (one for transmitting and one for receiving). A given HT interface may be operated in a cache coherent fashion (e.g. between processing nodes) or in a non-coherent fashion (e.g. to/from peripheral devices 16A-16B). In the illustrated embodiment, the HT circuits 24A-24B are not in use, and the HT circuit 24C is coupled via non-coherent links to the peripheral devices 16A-16B.

The peripheral devices 13A-13B may be any type of peripheral devices. For example, the peripheral devices 13A-13B may include devices for communicating with another computer system to which the devices may be coupled (e.g. network interface cards, circuitry similar to a network interface card that is integrated onto a main circuit board of a computer system, or modems). Furthermore, the peripheral devices 13A-13B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "peripheral device" is intended to encompass input/output (I/O) devices.

Generally, a processor core 15A-15B may include circuitry that is designed to execute instructions defined in a given instruction set architecture. That is, the processor core circuitry may be configured to fetch, decode, execute, and store results of the instructions defined in the instruction set architecture. For example, in one embodiment, processor cores 15A-15B may implement the x86 architecture. The processor cores 15A-15B may comprise any desired configurations, including superpipelined, superscalar, or combinations thereof. Other configurations may include scalar, pipelined, non-pipelined, etc. Various embodiments may employ out of order speculative execution or in order execution. The processor core may include microcoding for one or more instructions or other functions, in combination with any of the above constructions. Various embodiments may implement a variety of other design features such as caches, translation lookaside buffers (TLBs), etc.

It is noted that, while the present embodiment uses the HT interface for communication between nodes and between a node and peripheral devices, other embodiments may use any desired interface or interfaces for either communication. For example, other packet based interfaces may be used, bus interfaces may be used, various standard peripheral interfaces may be used (e.g., peripheral component interconnect (PCI), PCI express, etc.), etc.

In the illustrated embodiment, processor core 15A includes an L1 cache 16A and an L2 cache 17A. Likewise, processor core 15B includes an L1 cache 16B and an L2 cache 17B. The L1 and L2 caches may be representative of any L1 and L2 cache found in a microprocessor. However, in one embodiment, the L2 caches 17A-17B may be implemented using a number of independently controllable memory blocks, as indicated by the dashed lines. In one implementation, addressing functionality to each of the memory blocks may be independently disabled. In another implementation, the power (VDD) supplied to each of the memory blocks may be independently removed.

In the illustrated embodiment, MBIST unit 75 may be configured to run diagnostics on the L1 caches 16A-16B, L2 caches 17A-17B as well as any other memory structures (not shown) on each processor core 15A-15B. In one embodiment, MBIST unit 75 may use any suitable memory test algorithm and may include one or more linear feedback shift register (LFSR) arrangements to generate memory test patterns. As will be described in greater detail below, in response to detecting a failure of a memory structure (e.g., L1 cache, L2 cache, etc.), MBIST unit 75 may be configured to notify configuration unit 50 of the failure.

In one embodiment configuration unit 50 may provide configuration and control of various memory and core functions. In one embodiment, configuration unit 50 may include configuration storages 51 such as programmable registers, for example, that may store values which correspond to various configuration preferences and states of the L2 caches 17A-17B and processor cores 15A-15B. For example, configuration unit 50 may be programmed to enable or disable one or more of the independently controllable memory blocks of each of L2 caches 17A-17B. In addition, configuration unit 50 may be programmed to enable and disable an entire processor core.

Configuration unit 50 may be further configured to reconfigure the processing node 12 dependent upon the configuration values stored within it. For example, configuration unit 50 may use the failure notifications received from MBIST unit 75 to reconfigure the processing node 12. In one embodiment, in response to a notification that one or more memory blocks of L2 cache 17A have failed, configuration unit 50 may be programmed to disable the failing memory blocks of L2 cache 17A. Alternatively, in addition to disabling the failing memory blocks of L2 cache 17A, configuration unit 50 may disable an equal number of memory blocks of L2 cache 17B in an effort to provide symmetric performance of processor cores 15A-15B. Similarly, in response to receiving a notification of a failed L1 cache (e.g., L1 cache 16B), configuration unit 50 may be programmed to disable the corresponding processor core (e.g., processor core 15B).

In one embodiment, the storages 51 of configuration unit 50 may include default preference values. Alternatively, preference values may be programmed into storages 51. These preference values may be used to determine which action may be taken in response to receiving a failure notification. For example, if one or more portions of a given L2 have failed. Configuration unit 50 may use these values to determine whether to disable just the failed portions of the L2 cache in the corresponding processor core or to also disable the same number and location of L2 cache portions in the other processor core. In addition, in one embodiment, configuration unit 50 may use the values to determine whether to remove power or disable addressing to the failed L2 portions. Further, the configuration values may be used to determine which, if any, portions of the L2 cache memories should be disabled at power-up. In response to an L1 cache failure, configuration unit 50 may use the values to determine which way to disable the associated processor core. In one embodiment, configuration unit 50 may remove power from the affected processor core 15, while in another embodiment configuration unit 50 may disable the clock tree of the affected processor core 15.

In one embodiment, MBIST unit 75 may run the diagnostics each time node 12 is powered up or brought out of reset. More particularly, each time processing node 12 is powered up or brought out of reset, processing node 12 may be dynamically reconfigured dependent upon the values stored within configuration unit 50 and dependent upon the results of the self test diagnostics performed by MBIST unit 75.

In an alternative embodiment, the results of the MBIST diagnostics may be output during a production test of the processing node 12. The results may be used to permanently reconfigure the processor node 12 using hard fuses as described above. In such an embodiment, the hard fuses may be accessed and programmed (blown) externally via a port such as the joint test action group (JTAG) port, for example. The configuration values may be read from the fuses and stored within the storage 51.

In another embodiment, the hard fuses may be overridden by external programming. In such an embodiment, storage 51 may be accessed and programmed via the JTAG port, for example. Overriding the hard fuse configuration in this way is sometimes referred to as programming via soft fuses.

In yet another embodiment, the configuration values may be programmed into storage 51 using software. For example, special instructions may be used to access storage 51.

It is noted that, while the computer system 10 illustrated in FIG. 1 includes one processing node 12, other embodiments may implement any number of processing nodes. Similarly, a processing node such as node 12 may include any number of processor cores, in various embodiments. Various embodiments of the computer system 10 may also include different numbers of HT interfaces per node 12, and differing numbers of peripheral devices 13 coupled to the node, etc.

Figure 2:
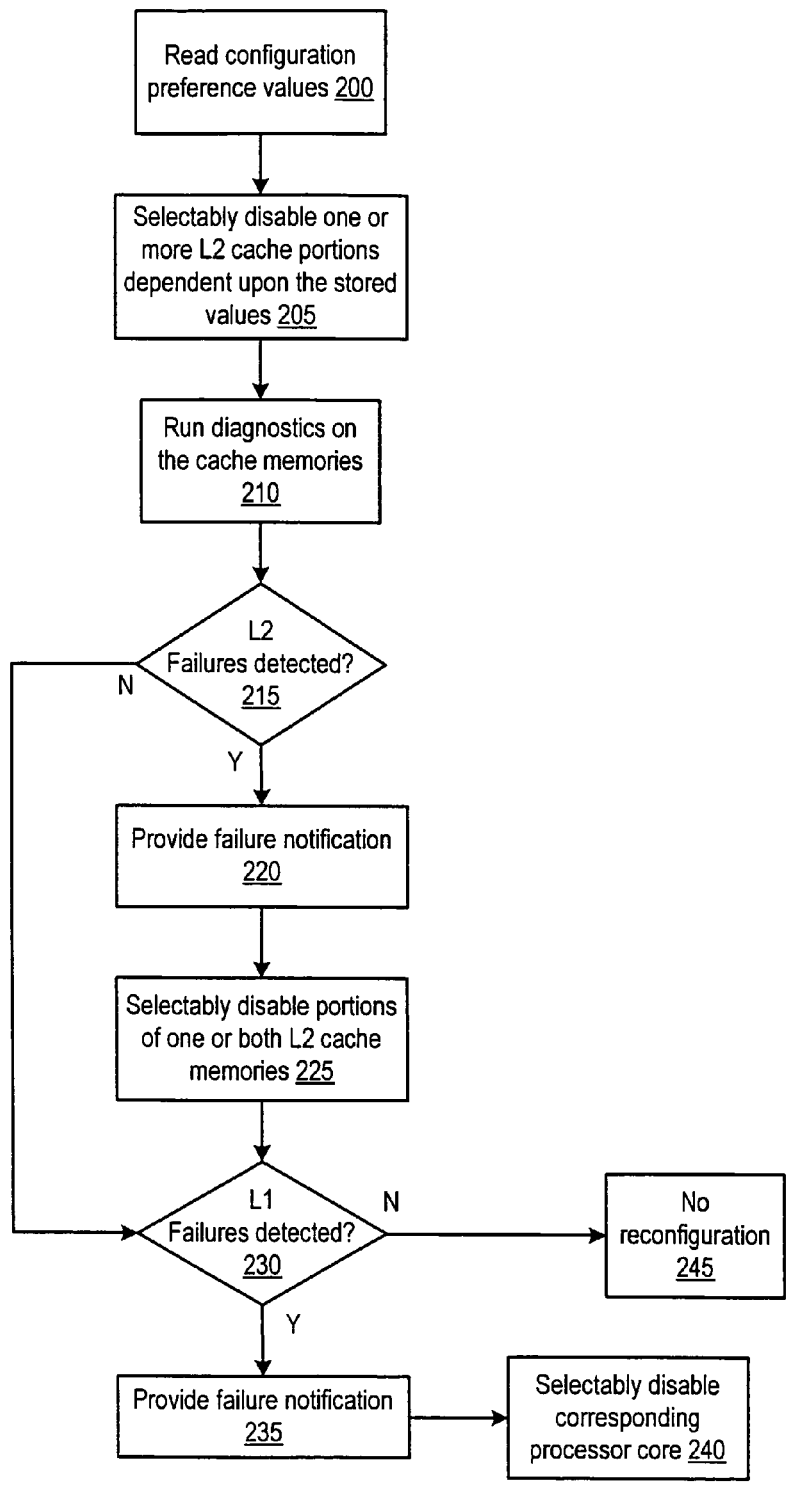
FIG. 2 is a flow diagram of one embodiment of the operation of a processing node of FIG. 1.

FIG. 2 illustrates a flow diagram describing the operation of one embodiment of processing node 12. Referring collectively to FIG. 1 and FIG. 2, in one embodiment, when node 12 is first powered up or brought out of reset, the configuration values stored within configuration unit 50 may be read and used to configure node 12 (block 200). For example, as described above, the storages within configuration unit 50 may store values that may be used to configure the L2 cache 17A-17B of node 12. In one embodiment these values may be programmed into configuration unit 50 through the use of fuses or some other permanent or semi-permanent method. As such, depending on the values in the storages, configuration unit 50 may selectably disable portions (i.e., memory blocks) of either or both of L2 cache 17A-17B (block 205).

In addition, at power-up or after coming out of reset, MBIST unit 75 may run diagnostics on the memory within node 12 (block 210). For example, in one embodiment, MBIST unit 75 may generate and run test patterns on each of L1 caches 16A-16B and L2 caches 17A-17B. If any failures are detected in either of L2 cache 17A-17B (block 215), MBIST unit 75 may provide a failure notification that identifies the failure to configuration unit 50 (block 220). In response to receiving the failure notification, configuration unit 50 may selectably disable the failing blocks of the bad L2 cache (block 225). In addition, depending on the configuration values stored within storages 51, configuration unit 50 may also disable a corresponding number of memory blocks of the other L2 cache. As described above, in various embodiments, disabling a portion or memory block of an L2 cache may include removing power or disabling the addressing logic from the from the affected blocks.

If MBIST unit 75 detects any failures within either L1 cache 16A-16B (block 230), MBIST unit 75 may provide a failure notification that identifies the failure to configuration unit 50 (block 235). In response to receiving the failure notification, configuration unit 50 may selectably disable the processor core associated with the failing L1 cache (block 240). As described above, in various embodiments, disabling a processor core may include removing power or disabling the clock tree to the affected processor core or both.

Referring back to block 215, if there are no L2 failures detected, operation proceeds to block 230 as described above. In block 230, if no failures are detected in the L1 caches 16A-16B then no reconfiguration may be necessary (block 245). It is noted that the order in which the above blocks have been presented is for discussion purposes and the actual order may be different in various embodiments. For example, MBIST unit 75 may run diagnostics on the L1 caches 16A-16B before running diagnostics on the L2 caches 17A-17B.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processing node comprising:
a first processor core including a first cache memory;
a second processor core including a second cache memory;
wherein each of the first and the second cache memories includes a respective plurality of independently controllable memory blocks; and
a configuration unit coupled to the first processor core and the second processor core and configured to selectably disable individual ones of the respective plurality of independently controllable memory blocks of either of the first cache memory or the second cache memory without disabling the entire first cache memory or the entire second cache memory, and while the first and the second processor cores remain in operation.

2. The processing node as recited in claim 1, wherein the configuration unit includes one or more storages configured to store values that indicate configuration preferences of the first and second processor cores.

3. The processing node as recited in claim 2, wherein the configuration unit is further configured to selectably disable individual ones of the respective plurality of independently controllable memory blocks of either of the first or the second cache memories dependent upon the values stored within the storages.

4. The processing node as recited in claim 1, further comprising a memory test unit coupled to the first processor core and the second processor core and to the configuration unit, wherein the memory test unit is configured to run diagnostics on the first and the second cache memories and in response to detecting a failure in one of the first and the second cache memories, to provide a first failure notification identifying the failure to the configuration unit.

5. The processing node as recited in claim 4, wherein in response to receiving the failure notification, the configuration unit is further configured to selectably disable individual ones of the respective plurality of independently controllable memory blocks of the first and the second cache memories identified in the first failure notification.

6. The processing node as recited in claim 4, wherein the first processor core further includes a third cache memory and the second processor core further includes a fourth cache memory.

7. The processing node as recited in claim 6, wherein the memory test unit is further configured to run diagnostics on the third and the fourth cache memories and in response to detecting a failure in one of the third and the fourth cache memories to provide a second failure notification identifying the failure to the configuration unit.

8. The processing node as recited in claim 7, wherein in response to receiving the second failure notification, the configuration unit is further configured to selectably disable one of the first and the second processor cores.

9. The processing node as recited in claim 8, wherein disabling one of the first and the second processor cores includes removing power.

10. The processing node as recited in claim 6, wherein the third cache memory and the fourth cache memory are each a level one (L1) cache memory.

11. The processing node as recited in claim 4, wherein disabling individual ones of the respective plurality of independently controllable memory blocks of the first and the second cache memories includes disabling addressing functionality to individual failed memory blocks identified by the memory test unit.

12. The processing node as recited in claim 4, wherein disabling individual ones of the respective plurality of independently controllable memory blocks of the first and the second cache memories includes removing power from individual failed memory blocks identified by the memory test unit.

13. The processing node as recited in claim 1, wherein the first cache memory and the second cache memory are each a level two (L2) cache memory.

14. A method of reconfiguring a processing node including a first processor core including a first cache memory and a second processor core including a second cache memory, the method comprising:

storing values that indicate configuration preferences of the first and second processor cores;

wherein each of the first and the second cache memories includes a respective plurality of independently controllable memory blocks;

selectably disabling individual ones of the respective plurality of independently controllable memory blocks of either of the first cache memory or the second cache memory without disabling the entire first cache memory or the entire second cache memory, dependent upon the stored values while the first and the second processor cores remain in operation.

15. The method as recited in claim 14, further comprising:

running diagnostics on the first cache memory and on the second cache memory and in response to detecting a failure in either of the first cache memory and the second cache memory; and providing a failure notification identifying the failure.

16. The method as recited in claim 15, further comprising in response to receiving the failure notification, selectably disabling individual ones of the respective plurality of independently controllable memory blocks of the first and the second cache memories identified in the failure notification.

17. The method as recited in claim 15, wherein disabling individual ones of the respective plurality of independently controllable memory blocks of the first and the second cache memories includes disabling addressing functionality to individual failed memory blocks identified during the running of the diagnostics.

18. The method as recited in claim 15, wherein disabling individual ones of the respective plurality of independently controllable memory blocks of the first and the second cache memories includes removing power from individual failed memory blocks identified during the running of the diagnostics.

19. The method as recited in claim 14, further comprising running diagnostics on a third cache memory of the first processor core and a fourth cache memory of the second processor core and in response to detecting a failure in one of the third and the fourth cache memories to provide a failure notification identifying the failure.

20. The method as recited in claim 19, further comprising in response to receiving the failure notification, selectably disabling one of the first and the second processor cores.

21. The method as recited in claim 20, wherein disabling one of the first and the second processor cores includes removing power.

22. The method as recited in claim 19, wherein the first cache memory and the second cache memory are each a level one (L1) cache memory.

* * * * *